United States Patent [19]
Morimoto

[11] 4,175,392
[45] Nov. 27, 1979

[54] TANDEM MASTER CYLINDER ASSEMBLY

[75] Inventor: Yoshiro Morimoto, Yokohama, Japan

[73] Assignee: Nissan Motor Co., Ltd., Japan

[21] Appl. No.: 785,031

[22] Filed: Apr. 6, 1977

[30] Foreign Application Priority Data

Apr. 16, 1976 [JP] Japan .................. 51-43942

[51] Int. Cl.² ............. B60T 11/06; B60T 11/20
[52] U.S. Cl. ...................... 60/561; 60/581; 60/588; 60/591; 403/317; 403/349
[58] Field of Search ............. 60/550, 553, 554, 561, 60/562, 588, 591, 592, 568, 570, 581; 92/165 PR, 255; 403/316, 317, 341, 348, 349; 285/302, 375, 376, 401, 402, 404, DIG. 4

[56] References Cited

U.S. PATENT DOCUMENTS

| 1,954,051 | 4/1934 | Moon ................. 403/349 |
| 2,074,416 | 3/1937 | Oliver ................ 60/561 |
| 2,174,615 | 10/1939 | Bowen ............... 60/562 |
| 3,165,896 | 1/1965 | Baldwin ............. 60/562 |
| 3,382,675 | 5/1968 | Wallace .............. 60/561 |
| 3,698,190 | 10/1972 | Miyai ................ 60/562 |
| 3,854,832 | 12/1974 | Cowper .............. 403/349 |
| 4,050,251 | 9/1977 | Carre ................ 60/550 |
| 4,074,532 | 2/1978 | Hayashida ........... 60/562 |

FOREIGN PATENT DOCUMENTS 500993 11/1954 Italy ........................ 60/562

*Primary Examiner*—Abraham Hershkovitz
*Attorney, Agent, or Firm*—Lane, Aitken & Ziems

[57] ABSTRACT

A tandem master cylinder assembly for use in split-type hydraulic brake systems of an automotive vehicle, comprising a fluid reservoir, a cylinder body having a cylinder bore communicable with the fluid reservoir through two ports formed in the cylinder body, primary and secondary pistons axially slidable as a single unit in the cylinder bore, a floating piston axially movable within the secondary piston and forming, jointly with the primary and secondary pistons, primary and secondary pressure chambers which are variable in volume depending upon the axial positions of the primary and secondary pistons relative to the cylinder body and the axial position of the floating piston relative to the cylinder body and to the secondary piston, and means to limit the distance of travel of the floating piston relative to the cylinder body.

16 Claims, 4 Drawing Figures

TANDEM MASTER CYLINDER ASSEMBLY

FIELD OF THE INVENTION

The present invention relates to fluid-operated brake systems of automotive vehicles and, particularly, to a tandem or dual master cylinder assembly to be used in split hydraulic brake systems consisting of front and rear brake systems which are adapted to apply braking forces to the front and rear road wheels, respectively, of a vehicle when the brake pedal is depressed.

DESCRIPTION OF THE PRIOR ART

A tandem master cylinder assembly for use in such brake systems has two cylinder pistons which are respectively associated in effect with the front and rear wheel cylinders to actuate the mechanical brake units for the front and rear wheels. In the event one of the front and rear brake systems happens to fail inviting leak of the fluid from the fluid lines of the system, an increased fluid pressure is developed only in that section of the master cylinder assembly which is allocated to the brake system staying in properly operative conditions, when the pedal is depressed by the driver of the vehicle. Under these conditions, the travel of one of the pistons is ineffective in building up an increased fluid pressure in the associated section of the master cylinder assembly and, for this reason, gives rise to an increase in the free travel or clearance to be taken up by the brake pedal during an incipient stage after the brake pedal is depressed. Such an increase in the free travel of the brake pedal gives a feeling of insecurity to the vehicle driver. Because, furthermore, of the fact that the fluid pressure to be developed in the brake system remaining properly operative is unchanged or unaugmented and thus the loss or reduction of the fluid pressure in the other brake system is not compensated for unless the brake pedal is depressed deeper than usual, the vehicle driver is further given a feeling of danger.

The cylinder pistons in a prior-art tandem master cylinder assembly are arranged in such a manner that one of the pistons is initiated into motion after the other piston has been moved. To accommodate the axial movements of the two pistons which are thus initiated into motion at different timings, the cylinder assembly tends to be large-sized particularly in the overall length thereof and not only makes serious the space requirement of the vehicle for the cylinder assembly but is responsible for an increase in the production cost of the split brake systems.

The present invention contemplates elimination of these drawbacks which have been inherent in conventional tandem master cylinder assemblies for use in split hydraulic brake systems for automotive vehicles.

It is, accordingly, an important object of the present invention to provide an improved tandem master cylinder which is capable of producing braking forces which are approximately or practically unchanged even when a failure is invited in one of the split brake systems.

It is another important object of the present invention to provide an improved tandem master cylinder assembly which is adapted to minimize the increment of the free travel of the brake pedal under the conditions in which one of the split brake systems is not properly operative.

It is still another important object of the present invention to provide an improved tandem master cylinder assembly featuring a small-sized construction having a reduced overall length.

It is yet, another important object of the present invention to provide an improved tandem master cylinder assembly which is simple in construction and economical to manufacture and to operate.

SUMMARY OF THE INVENTION

In accordance with the present invention, these and other objects of the present invention are accomplished basically in a tandem master cylinder assembly for use in split front and rear hydraulic brake systems of an automotive vehicle, comprising a fluid reservoir for storing therein fluid for the brake systems; a cylinder body formed with an elongated cylinder bore and primary and secondary ports which are spaced apart from each other axially of the cylinder body for providing communication between the fluid reservoir and the cylinder bore; primary and secondary pistons interlocked with each other by mating engagement therebetween and axially movable as a single unit within the cylinder bore, the secondary piston being formed with axial bore portions having different cross sectional areas; a floating piston axially movable within the bore portions in the floating piston, the primary, secondary and secondary pistons jointly forming in the cylinder bore primary and secondary variable-volume pressure chambers which are communicable with the fluid reservoir through the primary and secondary ports, respectively, one of the pressure chamber being in communication with one of the front and rear brake systems and the other of the pressure chambers being in communication with the other brake system; sealing elements movable with the primary and secondary pistons between respective positions isolating the primary and secondary variable-volume pressure chambers from the primary and secondary ports, respectively, and respective positions allowing the primary and secondary variable-volume pressure chambers to communicate with the primary and secondary ports, respectively; and means for limiting the axial movement, in opposite directions, of the floating piston relative to the cylinder body.

DESCRIPTION OF THE DRAWINGS

The features and advantages of the present invention will be understood more clearly from the following description taken in conjunction with the accompanying drawings, in which.

DESCRIPTION OF PREFERRED EMBODIMENT

Figure 1:
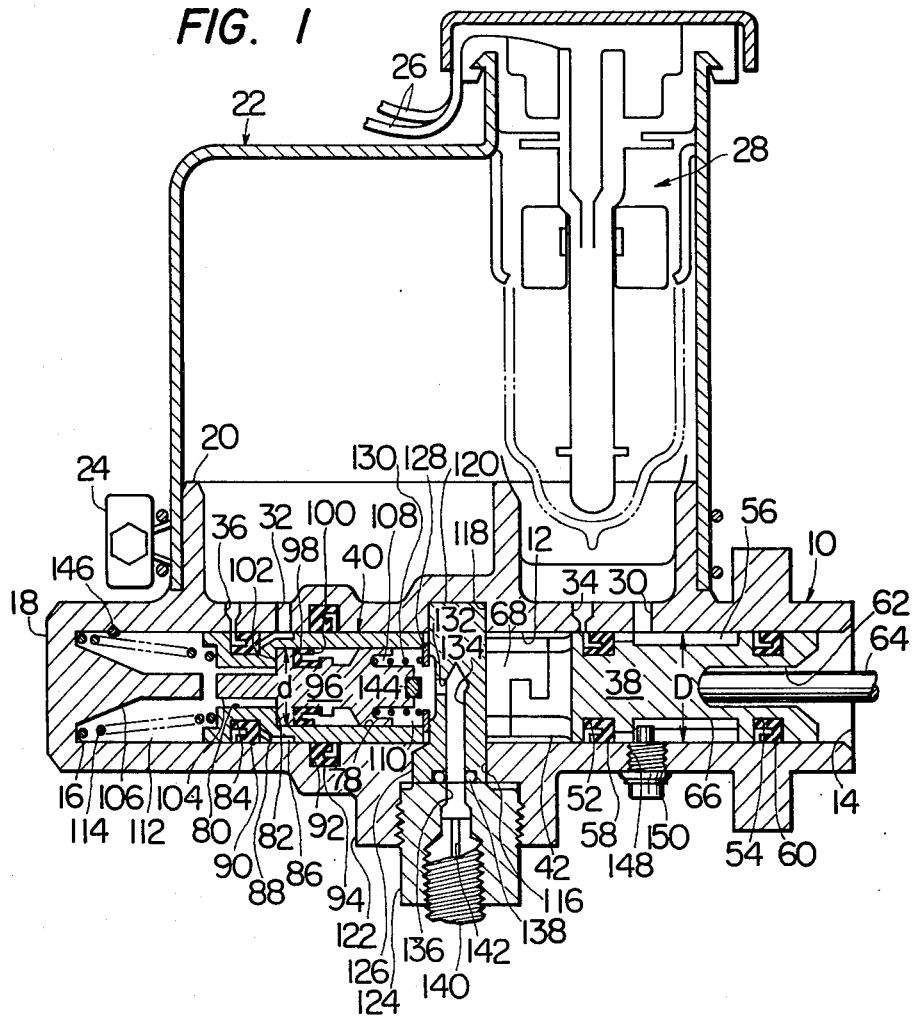
FIG. 1 is a sectional view showing a prefereed embodiment of a master cylinder assembly according to the present invention.

Referring to the drawings, first to FIG. 1 thereof, a tandem master cylinder assembly embodying the present invention comprises a stationary cylinder body 10 formed with an elongated cylinder bore 12 having a circular cross section which is substantially uniform throughout the length of the bore 12. The cylinder bore 12 has an open first end 14 which is assumed to be located at the rear end of the cylinder body 10 and a closed second end 16 which accordingly is assumed to be located at the front end of the cylinder body 12 and which is closed by a front end wall portion 18 of the cylinder body 10. The cylinder body 10 has an upper wall portion formed with a continuous upstanding projection 20 to which a fluid reservoir tank 22 is fixedly connected by suitable fastening means such as clamp assembly 24. The fluid reservoir tank 22 is in communication with a fluid supply tank (not shown) through hoses 26 leading from the upper end of the reservoir tank 22. Though not shown in the drawings, the fluid supply tank is usually positioned above the level of the upper end of the reservoir tank 22 so that the fluid stored in the supply tank is automatically fed by gravity to the reservoir tank 22 through the hoses 26, as is well known in the art. The fluid reservoir tank 22 is shown provided with a fluid-level indicator 28, the purpose of which is also well known in the art and thus will not be herein described.

The cylinder body 10 has formed in the upper wall portion thereof primary and secondary breather ports 30 and 32 and primary and secondary compensating ports 34 and 36, each of the ports providing communication between the fluid reservoir tank 22 and the bore 12 in the cylinder body 10. These ports 30, 32, 34 and 36 are arranged in such a relationship that the primary breather and compensating ports 30 and 34 are located rearwardly of the secondary breather and compensating ports 32 and 36 across an intermediate longitudinal portion of the cylinder bore 12 and that the primary and secondary breather ports 30 and 32 are located slightly rearwardly of the primary and secondary compensating ports 34 and 36, respectively.

The cylinder body 10 has incorporated therein primary and secondary pistons 38 and 40 which are axially slidable in the cylinder bore 12. As is more clearly shown in FIG. 2, the primary piston 38 has a hollow front end portion 42 formed with a pair of generally U-shaped axial slots 44 and 44' which longitudinally extend substantially in parallel with the center axis of the piston 30 and substantially in parallel with the center axis of the piston 38 and which are open at their respective foremost ends. The slots 44 and 44' are diametrically opposite to and substantially aligned with each other across the center axis of the piston 38. The primary piston 38 further has a pair of axial projections 46 and 46' which extend forwardly from the hollow front end portion 42 of the piston, each of the axial projections 46 and 46' having one side edge merging straight forward out of one of the axial side edge portions defining each of the slots 44 and 44', respectively, in the piston 38. The axial projections 46 and 46' merge into limb portions 48 and 48', respectively, which are substantially perpendicularly bent from the respective foremost ends of the projections 46 and 46' and which thus form circumferential slots 50 and 50', respectively, along the axially inner edges of the limb portions 48 and 48', the slots 50 and 50' being open adjacent to the leading ends of the limb portions 48 and 48', respectively. The axial projections 46 and 46' and the limb portions 48 and 48' have respective cross sections which are arcuately curved about the center axis of the piston 38 with a radius of curvature which is substantially equal to the radius of curvature of the hollow front end portion 42 of the piston 38. Furthermore, the axial projection 46 and the limb portion 48 adjacent to one slot 44 are substantially symmetric to the axial projection 46' and the limb portion 48', respectively, adjacent to the other slot 44' with respect to the center axis of the piston 38.

Turning back to FIG. 1, the primary piston 38 is further formed with front and rear circumferential grooves 52 and 54 and an intermediate circumferential groove 56 which is contiguous at its foremost end to the front circumferential groove 52 and which is isolated at its rearmost end from the rear circumferential groove 54, the axial groove 56 being constantly open to the primary breather port 30. The front and rear circumferential grooves 52 and 54 have snugly received therein annular sealing cups 58 and 60, respectively, which have their outer peripheral faces held in close yet slidable contact with the inner peripheral surface of the cylinder body 10. The front sealing cup 58 is axially movable, together with the primary piston 38, between a first position rearwardly past the primary compensating port 34 as shown in FIG. 1 and a second position forwardly remote from the compensating port 34. The primary piston 38 has axially formed in a rear end portion thereof an elongated counterbore 62 which is open at the rearmost end of the piston 38. A cylinder actuating push rod 64 axially projects into the counterbore 62 and is engageable at its leading end with the bottom wall of the counterbore 62. Though not shown, the push rod 64 is operatively connected to the brake pedal of the vehicle through a suitable mechanical linkage as is customary in the art. In this instance, the push rod 64 may be either a mechanical push rod which is directly connected to such a mechanical linkage or may be a hydraulic push rod which forms part of a well known vacuum-operated power brake unit connecting the master cylinder assembly to the mechanical push rod. For the purpose that will be clarified as the description proceeds the primary piston 38 is further formed with an axial groove 66.

Referring again to FIG. 2, the secondary piston 40 has a hollow rear end portion 68. The end portion 68 of the secondary piston 40 is configured similarly to the previously described hollow front end portion 42 of the primary piston 38 and is, thus, formed with a pair of generally U-shaped axial slots 70 and 70', axial projections 72 and 72' adjacent the slots 70 and 70', respectively, limb portions 74 and 74' bent from the axial projections 72 and 72', respectively, and circumferential slots 76 and 76' extending alongside the limb portions 74 and 74', respectively, the U-shaped slots 70 and 70' being open at their respective rearmost ends. The axial projections 72 and 72' and the limb portions 74 and 74' of the secondary piston 40 are sized substantially equally to their respective counterparts of the primary piston 38, and the primary and secondary pistons 38 and 40 are interlocked with each other by axial and circumferential mating engagement therebetween in such a manner that the limb portions of one piston are respectively received in the circumferential slots formed by the limb portions of the other piston. With the primary and secondary pistons 38 and 40 thus assembled into a single unit, the axial slots 46 and 46' in the primary piston 38 are continuous to the axial slots 70 and 70' in the secondary piston 40 so that the two pistons 38 and 40 jointly form a pair of elongated slots each having closed opposite ends. The primary and secondary pistons 38 and 40 which are assembled together as above described have further jointly formed therein a continuous cylindrical chamber which is constituted in part by the internal open space in the primary piston 38 and in part by the internal open space in the secondary piston 40.

Reverting again to FIG. 1, the secondary piston 40 is further formed with an intermediate bore portion 78 which is contiguous at its rear end to the above-mentioned chamber in the primary and secondary pistons 38 and 40 and a front bore portion 80 which is smaller in diameter than the intermediate bore portion 78 and which is open at its rear end to the intermediate bore portion 78 and at its front end to an internal space formed between the piston 40 and the inner face of the previously mentioned front end wall portion 18 of the cylinder body 10. Thus, the secondary piston 40 has at the front end of the intermediate bore portion 78 an internal annular face 82 having an inner circumferential end which circumscribes the rear end of the front bore portion 80. The secondary piston 40 has an external circumferential groove 84 in its wall portion surrounding the front bore portion 80 and an external circumferential groove 86 rearwardly spaced apart from the circumferential groove 84. The later circumferential groove 86 is communicable with the former circumferential groove 84 through a suitable number of holes or passageways 88 which are also formed in the secondary piston 40. The circumferential groove 84 has snugly received therein an annular sealing cup 90 which has its outer peripheral face in close but slidable contact with the inner peripheral surface of the cylinder body 10. The sealing cup 90 is axially movable, together with the secondary piston 40, between a first position rearwardly past the secondary compensating port 36 but forwardly past the secondary breather port 32 as shown and a second position forwardly remotest from the compensating port 36. The cylinder body 10 has formed in its inner wall portion surrounding the secondary piston 40 a circumferential groove 92 in which an annular sealing cup 94 is snugly received. The sealing cup 94 has its inner peripheral face in close yet slidable contact with that longitudinal wall portion of the secondary piston 40 which is formed with the above-mentioned intermediate bore portion 78.

The secondary piston 40 has mounted therewithin a floating piston 96 which is slidable in the intermediate bore portion 78 in the secondary piston 40. The floating piston 96 is formed with a circumferential groove 98 having snugly received therein an annular sealing cup 100 which is closely but slidably in contact with the inner peripheral surface of the above-mentioned longitudinal wall portion of the secondary piston 40 which is formed with the intermediate bore portion 78. The floating piston 96 has a land portion 102 next to the above-mentioned circumferential groove 98 and engageable by surface-to-surface contact with the previously described annular face 82 at the foremost end of the intermediate bore portion 78 in the secondary piston 40. The land portion 102 of the secondary piston 40 has an axial extension 104 projecting forwardly from the land portion 102 into the front bore portion 80 in the piston 40, the axial extension 104 having a cross sectional area smaller than the cross sectional area of the front bore portion 80 as shown. The cylinder body 10 has formed a generally frusto-conical internal projection 106 which projects rearwardly from the previously mentioned front end wall portion 18 of the cylinder body 10 and which has its rearmost end located at a predetermined distance from the foremost end 16 of the cylinder bore 12. The frusto-conical internal projection 106 has a reduced rear end portion substantially aligned in axial direction with the forward extension 104 of the floating piston 96, which is thus engageable at the foremost end of the extension 104 with the frusto-conical projection 106 when the floating piston 96 is axially moved toward the foremost end 16 of the cylinder bore 12. In other words, the forward extension 104 of the floating piston 96 and the frusto-conical projection 106 of the cylinder body 12 constitute in combination stop means for limiting the forward movement of the floating piston 96. The floating piston 96 is further formed with an axially extending annular groove 108 which is open at its rear end.

Each of the sealing cups 58, 60, 90, 94 and 100 used in the master cylinder assembly herein shown is of the lip-type having a generally U-shaped section in its axial direction and thus comprises radially spaced apart inner and outer annular lip portions. As is well known in the art, a sealing cup of this nature is adapted to have its inner lip portion urged to radially contract and its outer lip portion urged to radially expand and thus provides an enhanced sealing performance when the fluid pressure built up in the annular gap between the inner and outer lip portions is higher than the fluid pressure which is developed behind the cup. When, conversely, the fluid pressure acting on the sealing cup from behind the cup is higher than the fluid pressure in the gap between the inner and outer lips, then the outer lip portion of the cup is forced to radially contract (as in the case of each of the external cups 58, 60, 90 and 100) or the inner lip portion of the cup is forced to radially expand (as in the case of the internal cup 94) and allows the fluid to move past the cup behind the cup.

The primary and secondary pistons 38 and 40 being assembled together in the previously described fashion, the pistons 38 and 40 are bodily movable in the cylinder bore 12 between the rearmost and foremost ends 14 and 16 of the bore 12 so that the sealing cups 58 and 90 respectively mounted on the pistons 38 and 40 are movable between the respective first and second positions thereof. With the floating piston 96 fitted in the secondary piston 40, furthermore, the cylinder body 10 has formed in the cylinder bore 12 a primary variable-volume pressure chamber 110 which is constituted in part by the previously mentioned continuous cylindrical chamber formed in the combined unit of the primary and secondary pistons 38 and 40 and in part by the space forming part of the intermediate bore portion 78 in the secondary piston 40 and contiguous to the chamber in the combination of the pistons 38 and 40 and a secondary variable-volume pressure chamber 112 which is constituted in part by the space between the foremost end of the cylinder bore 12 and the foremost end of the secondary piston 40 and in part by the cylindrical gap formed in the front bore portion 80 in the secondary piston 40 when the floating piston 96 is in a position having its land portion 102 in contact with the annular face 82 at the foremost end of the intermediate bore portion 78 in the secondary piston 40 as shown. When the floating piston 96 is in such a relative position to the secondary piston 40 as having the land portion 102 rearwardly spaced apart from the annular face 82 of the secondary piston 40, the above-mentioned secondary variable-volume pressure chamber 112 further consists of the space which is formed between the annular face 82 of the secondary piston 40 and the front face of the land portion 102 of the floating piston 96. The primary and secondary pistons 38 and 40 are movable as a single unit in the cylinder bore 12 in such a manner that the sealing cups 58 and 90 on the pistons are moved to the respective first and second positions thereof when the primary and secondary pistons 38 and 40 are moved to respective rearmost and foremost first and second axial positions, respectively, in the cylinder bore 12. The pistons 38 and 40 are urged to move toward the respective second axial positions thereof, viz., rearwardly in the cylinder bore 12 by suitable biasing means such as a conical helical compression spring 114 which is seated at one end on the inner face of the front end wall portion 18 of the cylinder body 10 and at the other end on the front end face of the secondary piston 38 as shown. The cylinder actuating push rod 64 is in engagement with the primary piston 38 in such a manner that the primary and secondary pistons 38 and 40 stay in the respective rearmost first axial positions thereof as shown when the brake pedal connected to the push rod 64 is released and that the pistons 38 and 40 are moved to the respective foremost second axial positions thereof when the brake pedal is depressed all the way down. When, thus, the brake pedal is released, the sealing cups 58 and 90 are held in the respective first positions allowing the primary and secondary compensating ports 34 and 36, respectively, to open and thereby providing communication between the fluid reservoir tank 22 and each of the primary and secondary variable-volume chambers 110 and 112 through each of the compensating ports 34 and 36. When the brake pedal is depressed past the free travel or clearance thereof from the released position, the primary and secondary pistons 38 and 40 are moved forwardly in the cylinder bore 12 toward the respective second axial positions thereof against the force of the compression spring 114 so that the sealing cups 58 and 90 are moved forwardly past the primary and secondary compensating ports 34 and 36, respectively, so that the fluid communication between the fluid reservoir tank 22 and each of the primary and secondary variable-volume chambers 110 and 112 is interrupted.

The cylinder body 10 has formed in its intermediate longitudinal wall portion a radial through hole 116 which is open at one end to the cylinder bore 12 and at the other end to the outside of the cylinder body 10 and a hole or recess 118 which is open at one end to the cylinder bore 12 and closed at the other end, the holes 116 and 118 being diametrically opposite to and aligned with each other across the center axis of the cylinder bore 12. An elongated cross member 120 which is herein assumed to be constituted by a pin by way of example is passed through the through hole 116 and has its leading end portion closely received in the hole 118. The cylinder body 10 has an internally threaded socket portion 112 having a bottom at the outer end of the through hole 116. An internally and externally threaded locking member 124 is screwed into the socket portion 122 of the cylinder body 10 and holds the cross member 120 locked to the cylinder body 10. The cross member 120 has a radial projection 126 closely received in a recess or notch formed in the cylinder body 10 and is thereby prevented from being rotated about its axis relative to the cylinder body 10. The cross member 120 is passed through the elongated slots formed in the combined unit of the primary and secondary pistons 38 and 40 which are thus prevented from being turned about the center axis of the cylinder bore 12 relative to the cylinder body 10. The cross member 120 is engageable with the edge portions of the pistons 38 and 40 at the opposite ends of the elongated slots in the combined units of the pistons and is thus also effective to limit the distance of movement of the primary and secondary pistons 38 and 40 in the cylinder bore 12. The primary and secondary pistons 38 and 40 thus assume their respective first and second axial positions thereof when the cross member 120 is in engagement with the edge portions of the pistons 38 and 40 at the foremost and rearmost ends, respectively, of the slots in the combined unit of the pistons. The retaining cross member 120 has attached thereto an annular spring seat member 128 which is located in the cylinder bore 12 rearwardly of the floating piston 96. A helical compression spring 130 is seated at one end on the front face of the spring seat member 128 and at the other end in the previously mentioned cylindrical groove 108 in the floating piston 96 so that the floating piston 96 is urged to move, relative to the cylinder body 10 and the secondary piston 40, forwardly, viz., toward the leading end of the frusto-conical projection 106 of the cylinder body 10.

The piston retaining member 120 has a radial hole 132 which is open to the primary variable-volume pressure chamber 110 in the cylinder bore 12 and which is substantially in line with the center axis of the cylinder bore 12. The cross member 120 is further formed with an axial passageway 134 having one end open to the above-mentioned radial hole 132, the other end of the axial passageway 134 being open at the external end of the cross member 120. The locking member 124 holding the cross member 120 fast on the cylinder body 10 is formed with a passageway 136 which has one end open to the outer end of the above-mentioned axial passageway 134 in the cross member 120 as shown. Between the cross member 120 and the locking member 124 is interposed an annular sealing element 138 for preventing leakage of fluid from the passageways 134 and 136 through the interstice between the members 120 and 124. An externally threaded plug 140 is screwed into the locking member 124 and is formed with a passageway 142 communicating with the passageway 136 in the locking member 124. Though not shown, the plug 140 is connected to a suitable conduit or hose leading to either the front wheel cylinders or the rear wheel cylinders. For convenience of description, it is herein assumed that the passageway 142 in the plug 140 is in communication with the front wheel cylinders. The cross member 120 in the embodiment shown in FIG. 1 is, thus, adapted to serve not only as means to maintain unchanged the angular positions of the primary and secondary pistons 38 and 40 and means to limit the distance of axial movement of the pistons 38 and 40 but as means to hold the spring seat member 128 in position and means to provide fluid communication between the primary variable-volume pressure chamber 110 in the cylinder bore 12 and the front wheel cylinders. The floating piston 96 has fixedly carried at its rearmost end a sealing valve element 144 which is substantially in line with the radial hole 132 in the cross member 120. The sealing valve element 144 is thus adapted to close the outer end of the radial hole 132 in the cross member 120 when the floating piston 96 is moved to an axial position closest to the piston retaining member 120. Thus, the cross member 120 further serves as means to limit the distance of rearward movement of the floating piston 96 relative to the cylinder body 10 and valve seat means cooperative with the sealing valve element 144. The cylinder body 12 is formed with a fluid port 146 which is open to the secondary variable-volume pressure chamber 112. The fluid port 146 is assumed to be in communication with the rear wheel cylinders (not shown). If desired, however, the port 146 may be in communication with the front wheel cylinders if the plug 140 formed with the passageway 142 communicating with the primary variable-volume pressure chamber 110 is connected to the rear wheel cylinders.

For the purpose of assuring the maintenance of the angular position of the primary piston 38 relative to the cylinder body 10, the cylinder body 10 is further formed with a threaded through hole 148 directed toward the previously mentioned axial groove 66 in the primary piston 38 and an externally threaded pin 150 is screwed through this hole 148 and projects into the groove 66 as illustrated.

Description will be hereinafter made regarding the operation of the hereinbefore described embodiment of the present invention under normal operating conditions of the front and rear brake systems and under the conditions in which a failure is involved in the front or rear brake system.

When the brake pedal is kept released, the primary and secondary pistons 38 and 40 are maintained in the respective first axial positions closest to the rearmost end 14 of the cylinder bore 12 as shown in FIG. 1 by the force of the compression spring 114 acting on the secondary piston 40. The sealing cups 58 and 90 on the primary and secondary pistons 38 and 40 are therefore held in their respective first axial positions rearwardly past the primary and secondary compensating ports 34 and 36, respectively. The primary and secondary compensating ports 34 and 36 are thus allowed to open to the primary and secondary variable-volume pressure chambers 110 and 112, respectively, which are therefore in communication with the fluid reservoir tank 22 through the ports 34 and 36. In the primary and secondary variable-volume pressure chamber 110 and 112 is thus established only a fluid pressure resulting from the head of the fluid stored in the reservoir tank 22. Under these conditions, substantially no fluid pressure is developed in the front and rear wheel cylinders.

When the brake pedal is then depressed past the free travel or clearance thereof, then the cylinder actuating push rod 64 is axially moved forwardly so that the primary and secondary pistons 38 and 40 are moved as a single unit in the cylinder bore 12 away from the first axial positions thereof against the force of the compression spring 114. The sealing cups 58 and 90 on the primary and secondary pistons 38 and 40 therefore moved either to the positions covering the primary and secondary compensating ports 34 and 36, respectively, or positions which are forwardly past the compensating ports 34 and 36, respectively. The primary and secondary variable-volume pressure chambers 110 and 112 are now isolated from the primary and secondary compensating ports 34 and 36, respectively, and accordingly from the fluid reservoir tank 22. If, under these conditions, the rear brake system is normally operative, viz., free from any failure in the fluid lines thereof, the fluid pressure in the secondary variable-volume pressure chamber 112 is progressively augmented as the brake pedal is depressed deeper and as a consequence the secondary variable-volume pressure chamber 112 is axially contracted by the secondary piston 40 moved toward the foremost end 16 of the cylinder bore 12. The floating piston 96 is therefore moved rearwardly relative to both the cylinder body 10 and the secondary piston 40 by the fluid pressure in the secondary variable-volume pressure chamber 112 against the force of the compression spring 130 acting on the floating piston 96 and causes the primary variable-volume pressure chamber 110 to axially contract, If, under these conditions, the front brake system is also normally operative, the fluid pressure in the primary variable-volume pressure chamber 110 is augmented as the pressure chamber 110 is contracted. The floating piston 96 is in this fashion axially moved relative to the cylinder body 10 and the secondary piston 40 until the fluid pressures in the primary and secondary variable-volume pressure chambers 110 and 112 are equalized with each other.

Assuming that the diameters of the cylinder bore 12 and the intermediate bore portion 78 in the secondary piston 40 are D and d, respectively, and the force imparted to the combined unit of the primary and secondary pistons 38 and 40 from the push rod 64 is F, then the fluid pressure Pf and Pr developed in the primary and secondary variable-volume pressure chambers 110 and 112 can be approximated as $$Pf = F/(\pi/4) \cdot D^2 \qquad \text{Eq. 1}$$

$$Pr = F/(\pi/4) \cdot d^2 \qquad \text{Eq. 2}$$

wherein the forces of the compression springs 114 and 130 are disregarded because they are negligibly small as compared with the forces resulting from the fluid pressures acting on the pistons 38, 40 and 96.

The fluid pressure Pf thus built up in the primary variable-volume pressure chamber 110 is directed through the radial hole 132 and axial passageway 134 in the cross member 120 and the respective passageways 136 and 142 in the locking member 124 and plug 140 to the front wheel cylinders while the fluid pressure Pr developed in the secondary variable-volume pressure chamber 112 is directed through the fluid port 146 to the rear wheel cylinders. The front and rear road wheels of the vehicle are thus braked upon in normal conditions by the braking forces which are proportional to the fluid pressures Pf and Pr, respectively.

In case a failure happens to exist in the front brake system, the fluid in the front brake system leaks out of the system so that the fluid pressure in the primary variable-volume pressure chamber 110 is reduced or lost. When the brake pedal is depressed under such a condition, only the fluid pressure in the secondary variable-volume pressure chamber 112 is augmented by the forward movement of the secondary piston 40 in the cylinder bore 12. The floating piston 96 is therefore axially moved against the force of the associated compression spring 130 to its rearmost axial position having the sealing valve element 144 forced against the cross member 120, closing the outer end of the radial hole 132 in the cross member for thereby preventing further leakage of the fluid out of the primary variable-volume pressure chamber 110. Under these conditions, the fluid pressure Pr' which is developed in the secondary variable-volume pressure chamber 112 is given by $$Pr' = F/(\pi/4) \cdot (D^2 - d^2). \qquad \text{Eq. 3}$$

If, in this instance it is assumed that $D = \sqrt{2}d$ by way of example, then there results from Equations 2 and 3

$$Pr' = F/(\pi/4) \cdot (D^2 - \tfrac{1}{2}D^2) = 2F/(\pi/4)D^2 = 2Pr.$$

This means that the fluid pressure Pr' which is built up when the front brake system is in failure doubles the fluid pressure Pr developed under normal operating conditions of the brake system. Under the conditions in which the front brake system is inoperative, therefore, the braking forces applied to the rear road wheels are substantially twice as great as the braking forces exerted thereon under normal operating conditions of the front and rear brake systems so that the vehicle can be braked upon by adequate forces. When the brake pedal is then released and accordingly the combined unit of the primary and secondary pistons 38 and 40 is returned to its initial rest position, the floating piston 96 is maintained in the axial position having the sealing valve element 144 held in contact with the cross member 120 against the force of the compression spring 130 by virtue of the fluid pressure established in the secondary variable-volume pressure chamber 112 due to the head of the fluid stored in the fluid reservoir tank 22 which is in communication with the pressure chamber 112 through the secondary compensating port 36, the compression spring 130 being so selected that the force thereof is overcome by a force resulting from the particular fluid pressure resulting from the head of the fluid in the reservoir tank 22 and acting on the floating piston 96.

In the event a failure is invited in the rear brake system, the fluid in the rear brake system leaks out of the system and as a consequence the fluid pressure in the secondary variable-volume pressure chamber 112 is reduced or lost. The floating piston 96 is therefore moved to its foremost axial position relative to the secondary piston 40 partly by the force of the compression spring 130 and partly by the fluid pressure in the primary variable-volume pressure chamber 110 and has its land portion 102 held in contact with the internal annular face 82 of the secondary piston 40 as shown. If, under these conditions, the brake pedal is depressed and accordingly the primary and secondary pistons 38 and 40 are moved forwardly in the cylinder bore 12, the floating piston 96 is also moved forwardly together with the secondary piston 40 until the floating piston 96 has its forward extension 104 brought into abutting engagement with the frusto-conical internal projection 106 of the cylinder body 10. The primary variable-volume pressure chamber 110 is thus axially contracted as the primary piston 38 is forwardly moved toward the floating piston 96 against the force of the compression spring 114 so that the fluid pressure in the primary variable-volume pressure chamber 110 is augmented and developed and increased fluid pressure in the front wheel cylinders. The fluid pressure Pf' thus built up in the primary variable-volume pressure chamber 110 is given by the equation $$Pf = F/(\pi/4) \cdot d^2. \qquad \text{Eq. 4}$$

If it is assumed that $D = \sqrt{2}d$ as previously noted, then the value Pf' can be written from Equations 1 and 4 as $$Pf' = F/(\pi/4) \cdot (\tfrac{1}{2}) \cdot D^2 = 2F/(\pi/4) \cdot D^2 = 2Pf.$$

The fluid pressure Pf' which is built up in the presence of a failure in the rear braking system thus doubles the fluid pressure Pf which is developed under normal operating conditions of the brake system. When the rear brake system is inoperative, therefore, the braking forces applied to the front road wheels are substantially twice as great as the braking forces exerted on the road wheels under normal operating conditions of the front and rear brake systems.

When, thus, the brake pedal is depressed under the condition in which a failure exists in the front or rear brake system of the vehicle, the floating piston 96 is axially moved through a distance which is substantially equal to the axial spacing between the cross member 120 and the rearmost end of the sealing valve element 144 on the floating piston 96 in the secondary piston 40 in the first axial position thereof or the axial spacing between the rearmost end of the frusto-conical internal projection 106 of the cylinder body 10 and the foremost end of the forward extension 104 of the floating piston 96 in the secondary piston 40 in the first axial position thereof. Such a distance gives an increment in the distance of free travel of the brake pedal from the fully released position thereof. The increment in the distance of free travel of the brake pedal as caused by an occurrence of a failure in the front or rear brake system is for this reason limited to an extremely small value and is thus far less than an increment in the free pedal travel as caused in split front and rear brake systems using a prior-art tandem master cylinder assembly in which can effective braking fluid pressure for a braking system remaining properly operative is not built up before one of the pressure chambers is contracted to nil. The tandem master cylinder provided by the present invention is therefore not only capable of producing an adequate braking fluid pressure in the event of a failure invited in the front or rear brake system but is effective to obviate the feeling of insecurity that would otherwise be given to the vehicle driver. Because, furthermore, of the fact that the primary and secondary pistons 38 and 40 are adapted to be bodily moved as a single unit when the brake pedal is depressed past the free travel thereof, the primary and secondary compensating ports 34 and 36 in the cylinder body 10 can be closed simultaneously by the sealing cups 58 and 90, respectively, which are mounted on the pistons 38 and 40 and, for this reason, the distance of travel of the combined unit of the pistons 38 and 40 are accordingly the overall length of the cylinder body 10 can be reduced significantly as compared with a prior-art tandem master cylinder assembly in which one of the compensating ports is closed by the movement of one piston which is initiated into motion by the fluid pressure developed by closing of the other compensating port. The overall length of the cylinder body 10 being thus reduced, the spacings between the ports 30, 32, 34 and 36 for providing fluid communication between the cylinder bore 12 and the fluid reservoir tank 22 can also be reduced significantly and, as a consequence, only one fluid reservoir tank suffices for one master cylinder assembly in contrast to conventional tandum master cylinder assemblies each requiring two fluid reservoir tanks respectively assigned to the primary and secondary pressure chambers in the master cylinder assembly.

Figure 2:
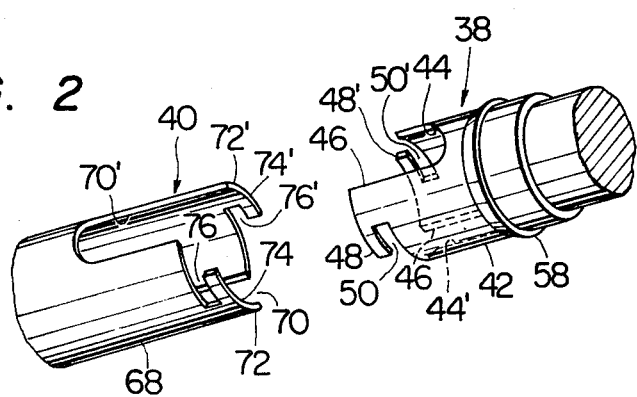
FIG. 2 is a disassembled prespective view showing cylinder pistons incorporated in the master cylinder assembly of FIG. 1.
Figure 3:
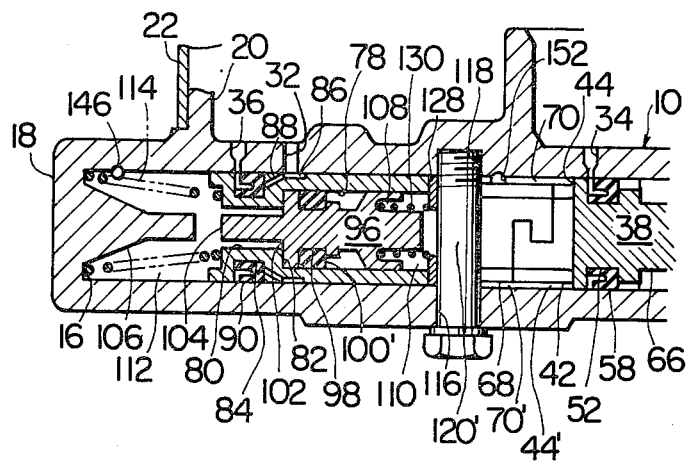
FIG. 3 is a partial longitudinal sectional view showing part of a modification of the embodiment of FIGS. 1 and 2.
Figure 4:
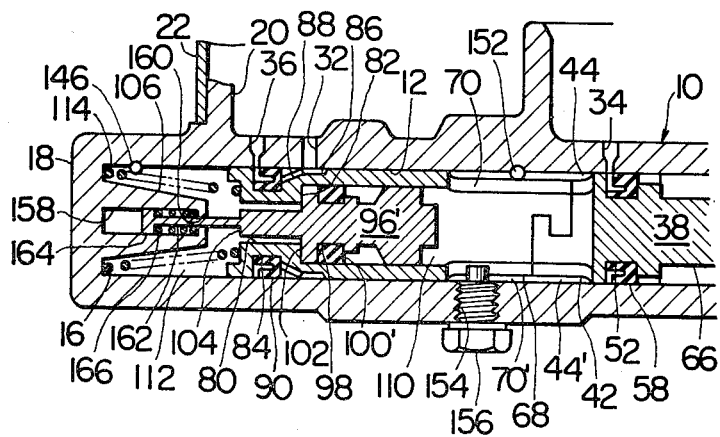
FIG. 4 is a view similar to FIG. 3 but shows another modification of the embodiment of FIGS. 1 and 2.

FIGS. 3 and 4 illustrate modifications of the embodiment hereinbefore described with reference to FIGS. 1 and 2. Each of the embodiments of FIGS. 3 and 4 is essentially similar to the embodiment of FIGS. 1 and 2 except for the arrangement for limiting the rearward movement of the floating piston 96 and the arrangement in which the primary variable-volume chamber 110 is in communication with wheel cylinders. In each of FIGS. 3 and 4, therefore, the members, units and spaces having their exact counterparts are designated by the same reference numerals as in FIG. 1.

Referring to FIG. 3, the modified tandem master cylinder assembly is shown comprising a solid cross member 120' as an alternative to the cross member 120 of the embodiment of FIGS. 1 and 2. Similarly to the cross member 120 shown in FIG. 1, the solid cross member 120' is passed through the through hole 116 formed in the cylinder body and through the elongated slots formed in the combined unit of the primary and secondary pistons 38 and 40 and has its leading end portion snugly received in the hole 118 which is also formed in the cylinder body 10 in diametrically spaced relationship to the through hole 116 across the cylinder bore 12. The solid cross member 120' may be constituted by a usual bolt and screwed into the hole 118 as shown. The spring seat member 128 supporting the compression spring 130 for the floating piston 96 is mounted on the cross member 120'. The solid cross member 120' in the master cylinder assembly of FIG. 3 thus serves simply as means to maintain the angular positions of the primary and secondary pistons 38 and 40 unchanged relative to the cylinder body 10, means to limit the distance of the forward and rearward movements of the pistons 38 and 40 and means to support the compression spring 130 for the floating piston 96. The cylinder body 10 is formed with a fluid port 152 which is constantly open to the primary variable-volume pressure chamber 110 through one of the elongated slots in the combined unit of the primary and secondary pistons 38 and 40. Though not shown, the fluid port 152 is in communication with the front or rear wheel cylinder through suitable passageway. With the fluid port 152 thus arranged, the sealing cup provided between the secondary piston 40 and the floating piston 96 is subjected to the fluid pressures in both of the primary and secondary variable-volume pressure chambers 110 and 112 when the front and rear brake systems are properly operative. Thus, the particular sealing cup has a generally X-shaped section in its axial direction as indicated at 100'. The operation of the tandem master cylinder assembly constructed in this fashion is basically similar to the operation of the embodiment of FIGS. 1 and 2 and will therefore be readily understood from the description which has been made regarding the latter.

Turning to FIG. 4, the cylinder body 10 is formed with, as an alternative to the holes 116 and 118 in the embodiment of FIGS. 1 and 2, a threaded through hole 154 which is open to one of the elongated slots in the combined unit of the primary and secondary pistons 38 and 40. A bolt 156 or any other externally threaded member is screwed through this hole 154 and projects into the aforesaid one of the slots in the combined unit of the pistons 38 and 40. The bolt 156 is thus adapted to maintain the angular positions of primary and secondary pistons 28 and 40 unchanged relative to the cylinder body 10 and to limit the distance of the forward and rearward movements of the combined unit of the pistons 38 and 40. The cylinder body 10 is further formed with a fluid port 152 providing constant communication between the primary variable volume pressure chamber in the cylinder body 10 and the front or rear wheel cylinders through one of the elongated slots in the primary and secondary pistons 38 and 40, as in the embodiment of FIG. 3. Furthermore, the frusto-conical internal projection 106 of the cylinder body 10 is formed with an elongated cylindrical cavity 158 and a hole 160 formed in a rear end wall portion of the projection 106 and having one end open to the cavity 158 and the other end open to the cylinder bore 12 or more exactly to the secondary variable-volume chamber 120 in the cylinder body 10, the cavity 158 and the hole 160 having respective center axes which are substantially in line with the center axis of the cylinder bore 12. The floating piston now designated by 96' has a front rod portion 162 projecting forwardly from the forward extension 104 of the piston 96' into the cavity 158 through the hole 160 in the internal projection 106 of the cylinder body 10. The front rod portion 162 of the floating piston 96' forwardly terminates in an enlarged foremost end portion 164 which is axially movable in the cavity and has a helical compression spring 166 seated at its foremost end on the foremost end portion 164 and at its rearmost end on the inner face of the annular rear end wall portion of the frusto-conical inner projection 106 of the cylinder body 10 as shown for urging the floating piston 96' to move forwardly. The enlarged foremost end portion 164 of the floating piston 96' may be formed with a breather port (not shown) so that the movement of the floating piston 96' is hindered by the compression or expansion of the fluid in the cavity 158. The means to limit the distance of rearward movement of the floating piston 96' in the embodiment of FIG. 4 is thus constituted by the above described arrangement including the cavity 158 and hole 160 in the frusto-conical internal projection 106 of the cylinder body 10 and the front rod portion 162 and enlarged foremost end portion 164 of the floating piston 96'. The compression spring 166 is an alternative to the compression spring 130 in each of the embodiments of FIGS. 1 and 3. Thus, the operation of the embodiment illustrated in FIG. 4 is also essentially similar to the operation of the embodiment of FIG. 1. The floating piston 96' in the embodiment of FIG. 4 is also fitted with a sealing cup 100' having a generally X-shaped section in its axial direction for the same reason as explained in respect of the embodiment of FIG. 3.

In the case of the embodiment of FIG. 3, it is the spacing between the solid cross member 120' and the rearmost end of the floating piston 96 that gives an increment in the free travel of the brake pedal under the conditions in which a failure is invited in the front brake system, as will be readily understood from the foregoing description. Such an increment in the free pedal travel is given in the embodiment of FIG. 4 by the distance which the enlarged foremost end portion 164 of the floating piston 96' is rearwardly moved within the cavity 158 in the frusto-conical internal projection 106 of the cylinder body 10.

What is claimed is:

1. A tandem master cylinder assembly for use in split front and rear brake systems of an automotive vehicle, comprising a fluid reservoir for storing therein fluid for the brake systems; a cylinder body formed with an elongated cylinder bore and primary and secondary ports spaced apart from each other axially of the cylinder body for providing communication between said fluid reservoir and the cylinder bore; primary and secondary pistons interlocked with each other by axial and circumferential mating engagement therebetween and axially movable as a single unit within said cylinder bore, each of the primary and secondary pistons having a hollow axial end portion and being formed with a pair of axial slots open at the leading end of said end portion and diametrically opposite to each other across the center axis of each of the pistons, each of the slots in one of the pistons being contiguous to each of the slots in the other of the pistons so that the pistons jointly form a pair of elongated slots each having closed opposite axial ends, the secondary piston being further formed with axial bore portions having different cross sectional areas; a floating piston axially movable within said bore portions, the primary, secondary and floating pistons jointly forming in said cylinder bore primary and secondary variable-volume pressure chambers communicable with said fluid reservoir through said primary and secondary ports, respectively, one of the pressure chambers being in communication with one of said front and rear brake systems and the other pressure chamber being in communication with the other brake system; sealing elements movable with said primary and secondary pistons between respective positions isolating said primary and secondary variable-volume pressure chambers from said primary and secondary ports, respectively, and respective positions allowing the primary and secondary variable-volume pressure chambers to communicate with the primary and secondary ports, respectively; and a cross member which is fixedly connected to said cylinder body and which has a portion diametrically extending through said cylinder bore, the cross member being passed through said elongated slots jointly formed by said primary and secondary pistons for limiting the axial movement, in the opposite directions, of said floating piston relative to said cylinder body.

2. A tandem master cylinder assembly as set forth in claim 1, in which each of said primary and secondary pistons further has a pair of axial projections extending from the leading end of said end portion and a pair of limb portions which are substantially perpendicularly bent in circumferential direction of the piston from the respective leading ends of said axial projections and which form circumferential slots along the axially inner edges of said limb portions, respectively, the limb portions of each of the primary and secondary pistons being snugly received in the circumferential slots in the other of the pistons.

3. A tandem master cylinder assembly as set forth in claim 1, in which said end portion of each of said primary and secondary pistons is formed with an axial chamber open at the leading end of the end portion to the axial chamber in the other of the pistons and further open to the axial slots in each of the primary and secondary pistons, the axial chambers in the primary and secondary pistons forming part of said primary variable-volume pressure chamber.

4. A tandem master cylinder assembly as set forth in claim 3, in which said axial bore portions in said secondary piston consists of an intermediate bore portion open at one axial end to the axial chamber in the end portion of the secondary piston and an end bore portion open at one axial end to the other axial end of the intermediate bore portion, the end bore portion being smaller in cross sectional area than said intermediate bore portion and forming part of said secondary variable-volume pressure chamber.

5. A tandem master cylinder assembly as set forth in claim 4, in which said floating piston is axially slidable in said intermediate bore portion and has an axial extension axially movable in said end bore portion and in which said cylinder body has an internal projection axially projecting into said secondary variable-volume pressure chamber toward the leading end of said axial extension, the floating piston being axially movable within said cylinder bore between a first axial position engaging at one axial end thereof with said cross member and a second axial position having said axial extension thereof in contact at its leading end with said internal projection of the cylinder body.

6. A tandem master cylinder assembly as set forth in claim 5, in which said cross member is formed with a radial port open to said primary variable-volume pressure chamber and an axial passageway leading from said radial port, said axial passageway being in communication with one of said front and rear brake systems, said floating piston being operative to close said radial port when moved to said first axial position thereof.

7. A tandem master cylinder assembly as set forth in claim 6, in which said floating piston has mounted at its end closest to said cross member a sealing valve element which is adapted to be in contact with the cross member and to thereby close said radial hole when the floating piston is in said first axial position thereof.

8. A tandem master cylinder assembly as set forth in claim 6, further comprising biasing means urging said floating piston axially away from said cross member.

9. A tandem master cylinder assembly as set forth in claim 6, further comprising an annular lip-type sealing cup interposed between said floating piston and said secondary piston and hermetically separating said primary and secondary variable-volume pressure chambers from each other in said intermediate bore portion in the secondary piston, said sealing cup having a generally U-shaped cross section.

10. A tandem master cylinder assembly as set forth in claim 5, in which said cylinder body is formed with a fluid port which is constantly open to said primary variable-volume pressure chamber through one of said slots jointly formed in said primary and secondary pistons, said fluid port being in communication with one of said front and rear brake systems.

11. A tandem master cylinder assembly as set forth in claim 10, further comprising biasing means urging said floating piston axially away from said cross member.

12. A tandem master cylinder assembly as set forth in claim 10, further comprising an annular lip-type sealing cup interposed between said floating piston and said secondary piston and hermetically separating said primary and secondary variable-volume pressure chambers from each other in said intermediate bore portion in the secondary piston, said sealing cup having a generally X-shaped cross section.

13. A tandem master cylinder assembly as set forth in claim 1, in which each of said sealing elements is constituted by an annular lip-type sealing cup which has a generally U-shaped section in its axial direction and which is received in a circumferential groove formed in an outer peripheral wall of each of the primary and secondary pistons.

14. A tandem master cylinder assembly as set forth in claim 1, further comprising first biasing means urging said primary and secondary pistons to axially move in said cylinder bore in a direction to expand said secondary variable-volume pressure chamber and second biasing means urging said floating piston to axially move relative to said cylinder body in a direction to contract the secondary variable-volume pressure chamber.

15. A tandem master cylinder assembly as set forth in claim 1, in which said primary piston is formed with an axial groove in an outer peripheral wall thereof, said master cylinder assembly further comprising an elongated member fixedly secured to said cylinder body and radially projecting into said groove for maintaining the angular position of the primary piston about the center axis of said cylinder bore.

16. A tandem master cylinder assembly as set forth in claim 1, in which said primary piston is operatively connected to the brake pedal of the vehicle.

* * * * *